(12) United States Patent
Iwamoto et al.

(10) Patent No.: US 8,465,396 B2
(45) Date of Patent: Jun. 18, 2013

(54) AUTOMATIC TRANSMISSION AND HYDRAULIC CONTROL METHOD THEREFOR

(75) Inventors: Ikuhiro Iwamoto, Yokohama (JP); Osamu Sato, Fujisawa (JP)

(73) Assignee: Jatco Ltd, Fuji-shi (JP)

( * ) Notice: Subject to any disclaimer, the term of this patent is extended or adjusted under 35 U.S.C. 154(b) by 268 days.

(21) Appl. No.: 13/075,773

(22) Filed: Mar. 30, 2011

(65) Prior Publication Data

US 2011/0256975 A1    Oct. 20, 2011

(30) Foreign Application Priority Data

Apr. 15, 2010  (JP) ................................. 2010-093979

(51) Int. Cl.
*F16H 61/00* (2006.01)
*F16H 61/16* (2006.01)
*F16H 31/00* (2006.01)

(52) U.S. Cl.
USPC ............ 477/116; 477/125; 475/118; 475/131

(58) Field of Classification Search
USPC .................. 477/116, 117, 125, 126; 475/118, 475/120, 121, 122, 131, 134
See application file for complete search history.

(56) References Cited

U.S. PATENT DOCUMENTS

| | | | |
|---|---|---|---|
| 4,924,731 A | 5/1990 | Hayakawa et al. | |
| 5,658,218 A | 8/1997 | Jang et al. | |
| 5,679,095 A * | 10/1997 | Sekine et al. | 477/116 |
| 6,361,472 B1 * | 3/2002 | Murasugi | 477/117 |
| 7,278,944 B2 | 10/2007 | Morise et al. | |
| 8,262,527 B2 * | 9/2012 | Shimizu et al. | 475/134 |
| 8,292,771 B2 * | 10/2012 | Shimizu et al. | 475/116 |
| 8,359,135 B2 * | 1/2013 | Kariya et al. | 701/31.4 |
| 2006/0084545 A1 | 4/2006 | Morise et al. | |
| 2007/0015627 A1 * | 1/2007 | Hinami et al. | 477/97 |

FOREIGN PATENT DOCUMENTS

| | | |
|---|---|---|
| JP | 2002-147587 A | 5/2002 |
| JP | 2006-112503 A | 4/2006 |

* cited by examiner

*Primary Examiner* — Roger Pang
(74) *Attorney, Agent, or Firm* — Foley & Lardner LLP (57) ABSTRACT

A manual valve disconnects a line pressure oil passage and an R position pressure oil passage when a selector is in a D position or an N position and causes the R position pressure oil passage and the line pressure oil passage to communicate when the selector is in an R position. A switching valve is switched to disconnect a low & reverse brake pressure oil passage and the R position pressure oil passage when the selector is in the D position or the N position and a vehicle is driving at a vehicle speed equal to or lower than a predetermined vehicle speed.

6 Claims, 9 Drawing Sheets

| GEAR POSITION | FRICTION ELEMENT | | | | |
|---|---|---|---|---|---|
| | L/C | H/C | REV/C | L&R/B | 2-4/B |
| 1ST | O | | | (O) | |
| 2ND | O | | | | O |
| 3RD | O | O | | | |
| 4TH | | O | | | O |
| REVERSE | | | O | O | |

B2 P.C.VALVE: B2 PRESSURE CONTROL VALVE

AUTOMATIC TRANSMISSION AND HYDRAULIC CONTROL METHOD THEREFOR

FIELD OF THE INVENTION

The present invention relates to a hydraulic control in an automatic transmission.

BACKGROUND OF THE INVENTION

A stepped automatic transmission is composed of planetary gears and a plurality of friction elements (brakes, clutches), and a plurality of gear positions are realized by changing engaged states of the plurality of friction elements. The friction elements to be engaged are determined for each gear position. In the time of realizing a certain gear position, a shock or an interlock occurs if the friction element, which is not supposed to be engaged in this gear position, is engaged. Thus, it is desirable to drain a hydraulic pressure of the friction element, which is not supposed to be engaged, and prevent this friction element from being mistakenly engaged.

Figure 8A:
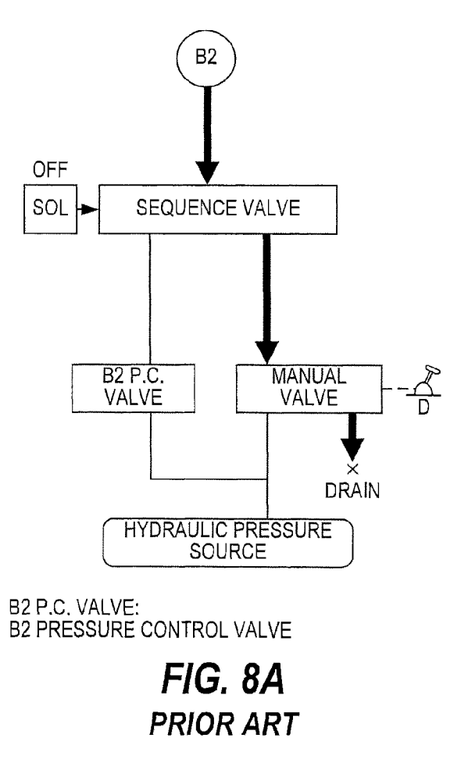
FIGS. 8A to 8C are diagrams showing a supplied state of a hydraulic pressure to a B2 brake in a prior art.
Figure 8B:
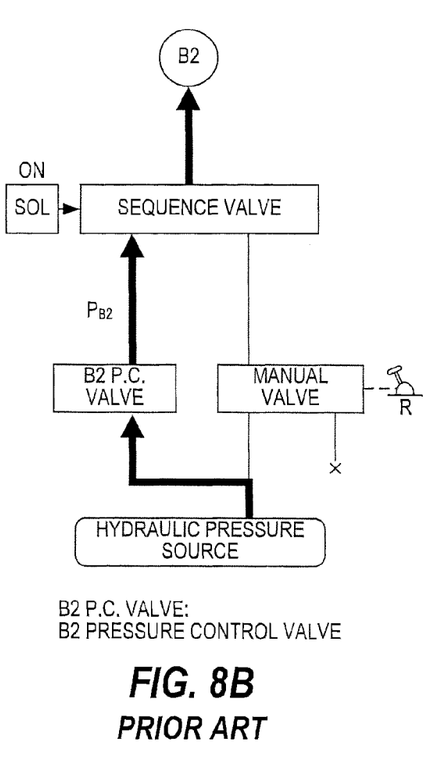
Figure 8C:
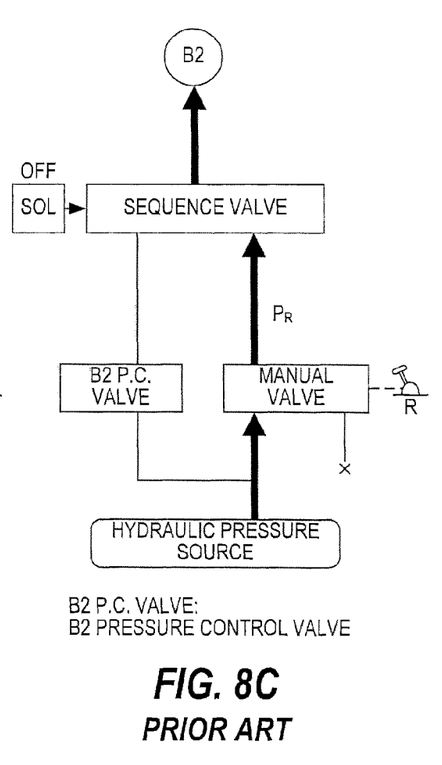

FIGS. 8A to 8C are schematic diagrams showing a supplied state of a hydraulic pressure to a B2 brake of an automatic transmission disclosed in JP2002-147587A.

The B2 brake is a friction element which is engaged only in a first gear position in an L position and in a reverse gear position in an R position. Since an interlock occurs if the B2 brake, which is not supposed to be engaged, is engaged at the time of selecting a D position, the B2 brake needs to be reliably released when selecting the D position. Thus, in JP2002-147587A, a B2 brake hydraulic pressure is drained via a sequence valve and a manual valve as shown in FIG. 8A when selecting the D position so that the B2 brake is not engaged even if a hydraulic pressure is output from a B2 pressure control valve.

In JP2002-147587A, if a selector is operated to the R position in a state of FIG. 8A, a solenoid is turned on during a shift associated with a position change (D-R position transient state) and a B2 brake pressure $P_{B2}$ adjusted by the B2 pressure control value is supplied to the B2 brake as shown in FIG. 8B. This is for gradually engaging the B2 brake by gradually increasing the B2 brake pressure $P_{B2}$ to alleviate a shock at the time of engagement. After the shift is completed (R position steady state), the solenoid is turned off again and an R position pressure $P_R$ (full hydraulic pressure) from the manual valve is supplied to the B2 brake as shown in FIG. 8C.

SUMMARY OF THE INVENTION

In JP2002-147587A, a shock at the time of engaging the B2 brake is alleviated by gradually increasing the B2 brake pressure $P_{B2}$ in the D-R position transient state as described above.

Figure 9:
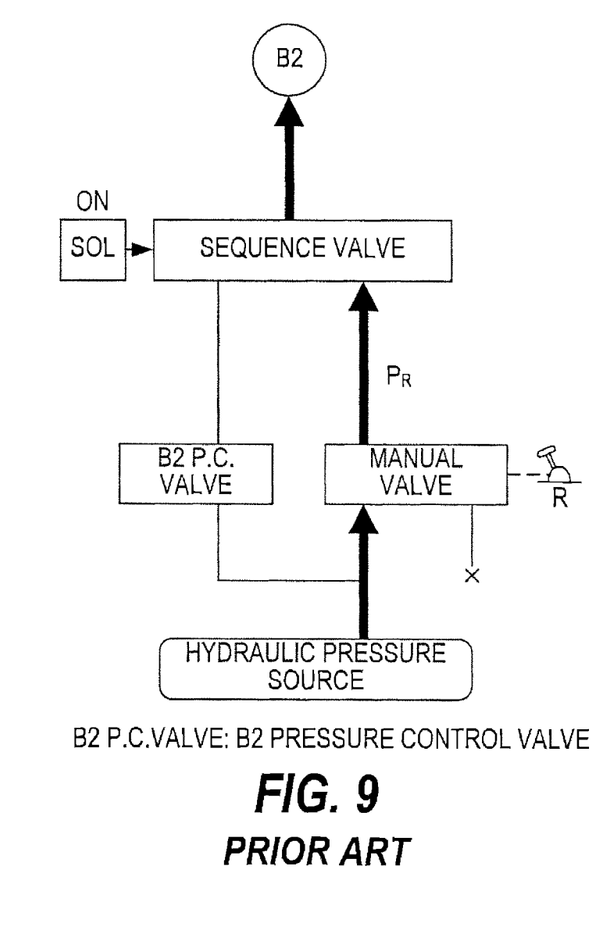
FIG. 9 is a diagram showing a technical problem of the prior art.

However, if the selector is operated from the D position to the R position in a short time, the sequence valve is switched later than the manual valve, which may possibly cause a shock. This is because, if the switching of the sequence valve is delayed, the B2 brake and a hydraulic pressure source temporarily communicate at an initial stage of the D-R position transient state as shown in FIG. 9, whereby the R position pressure $P_R$ (full pressure) from the hydraulic pressure source is supplied to the B2 brake to suddenly engage the B2 brake before the B2 brake pressure $P_{B2}$ is supplied.

The switching delay of the sequence valve results from the fact that the sequence valve is not switched upon mechanical transmission of a selector operation like the manual valve, but switched upon receiving a hydraulic pressure from the solenoid after the solenoid operates upon receiving an electrical signal from an inhibitor switch for detecting the selector operation. Specifically, the switching of the sequence valve is delayed due to a delay caused by the operation of the solenoid after a delay of 1 or 2 pulses in response to the electrical signal from the inhibitor switch for preventing chattering and a delay between the supply of the hydraulic pressure generated by the solenoid to the sequence valve and actual switching of the sequence valve.

The present invention was developed in view of the above technical problem and aims to suppress a shock caused when a selector is switched to an R position in a short time during driving in a D position in which an engine brake is not activated or N position.

According to an aspect of the present invention an automatic transmission which includes a planetary gear and a plurality of friction elements and realizes a plurality of gear positions by changing engaged states of the plurality of friction elements, the plurality of friction elements including a reverse friction element which is engaged when a selector is in an R position and released when the selector is in a D position in which an engine brake is not activated, is provided. The automatic transmission comprises: a hydraulic pressure source; a switching valve and a manual valve arranged between the hydraulic pressure source and the reverse friction element and adapted to switch oil passages in conjunction with a selector operation, the switching valve being switched later than the manual valve; a first oil passage connecting the reverse friction element and the switching valve; a second oil passage connecting the hydraulic pressure source and the manual valve; a third oil passage connecting the switching valve and the manual valve; and a control unit which controls the switching of the switching valve. The manual valve disconnects the second and third oil passages when the selector is in the D position or the N position and causes the second and third oil passages to communicate when the selector is in the R position; and the control unit switches the switching valve to disconnect the first and third oil passages when the selector is in the D position or the N position and a vehicle equipped with the automatic transmission is driving at a vehicle speed equal to or lower than a predetermined vehicle speed.

According to another aspect of the present invention, a hydraulic control method for the above-mentioned automatic transmission is provided.

Embodiments and advantages of this invention will be described in detail below with reference to the attached figures.

DESCRIPTION OF THE PREFERRED EMBODIMENTS

Hereinafter, an embodiment of the present invention is described with reference to the accompanying drawings.

Figure 1:
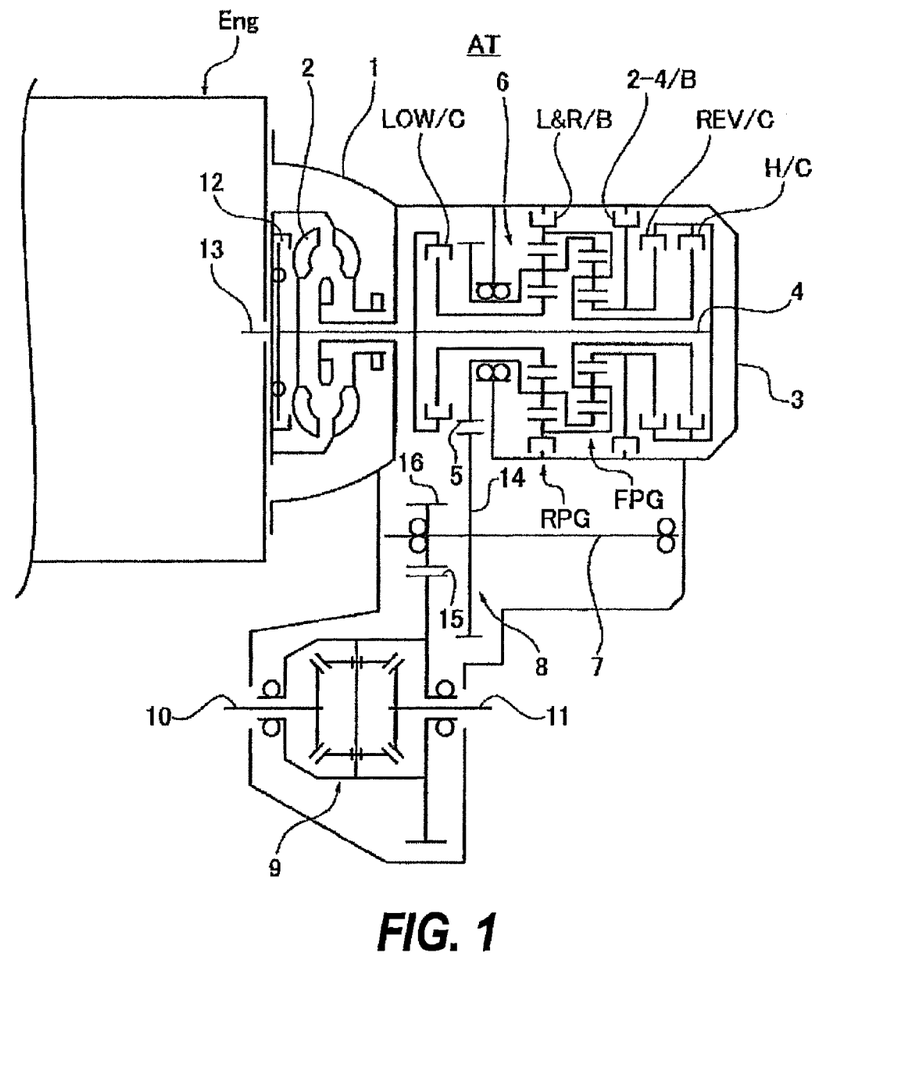
FIG. 1 is an overall construction diagram of a vehicle equipped with an automatic transmission.

FIG. 1 shows an overall construction of a vehicle equipped with an automatic transmission AT according to the embodiment of the present invention. The automatic transmission AT is the one for an FF vehicle with four forward gear positions and one reverse gear position. As shown in FIG. 1, the automatic transmission AT includes a converter housing 1, a torque converter 2, a transaxle case 3, a transmission input shaft 4, a transmission output gear 5, a transmission mechanism 6, a reduction gear shaft 7, a reduction gear mechanism 8, a differential gear mechanism 9, a left drive shaft 10 and a right drive shaft 11.

The torque converter 2 for realizing a start function and a vibration damping function is arranged in the converter housing 1. The torque converter 2 includes a lock-up clutch 12, which directly couples a crank shaft 13 of an engine Eng and the transmission input shaft 4 upon being engaged.

The transaxle case 3 is connected to the converter housing 1. The transmission mechanism 6 for realizing a transmission function, a forward/reverse switching function and a neutral function, the reduction gear mechanism 8 for realizing a speed reduction function and the differential gear mechanism 9 for realizing a differential function are arranged in the transaxle case 3.

The transmission mechanism 6 is arranged between the transmission input shaft 4 and the transmission output gear 5 and is composed of a combination of a front planetary gear FPG, a rear planetary gear RPG, a low clutch L/C, a low & reverse brake L&R/B (reverse friction element), a 2-4 brake 2-4/B, a reverse clutch REV/C and a high clutch H/C.

The reduction gear mechanism 8 is formed by mounting a first reduction gear 14 engaged with the transmission output gear 5 and a second reduction gear 16 engaged with a drive input gear 15 of the differential gear mechanism 9 on the reduction gear shaft 7.

The differential gear mechanism 9 equally distributes a drive force input from the drive input gear 15 to the left drive shaft 10 and the right drive shaft 11 while allowing differentials and transmits the drive force to unillustrated left and right front wheels.

Figure 2:
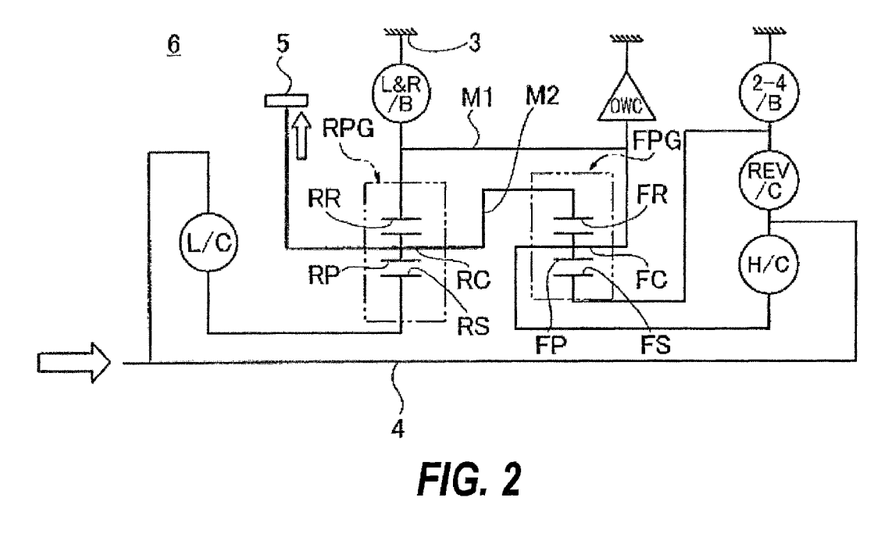
FIG. 2 is a construction diagram of a transmission mechanism of the automatic transmission.

FIG. 2 shows the construction of the transmission mechanism 6 of the automatic transmission AT.

The transmission mechanism 6 includes the single-pinion type front planetary gear FPG and rear planetary gear RPG as planetary gears and the low clutch L/C, the low & reverse brake L&R/B, the 2-4 brake 2-4/B, the reverse clutch REV/C and the high clutch H/C as friction elements. Further, a one-way clutch OWC is provided in parallel with the low & reverse brake L&R/B.

The front planetary gear FPG includes a front sun gear FS, a front ring gear FR and a front carrier FC carrying a front pinion FP engaged with both gears FS, FR.

The rear planetary gear RPG includes a rear sun gear RS, a rear ring gear RR and a rear carrier RC carrying a rear pinion RP engaged with both gears RS, RR.

The front carrier FC and the rear ring gear RR are integrally coupled by a first rotary member M1. The front ring gear FR and the rear carrier RC are integrally coupled by a second rotary member M2. Accordingly, by combining the front planetary gear FPG and the rear planetary gear RPG, four rotary elements (front sun gear FS, rear sun gear RS, first rotary member M1, second rotary member M2) obtained by subtracting two rotary elements from six rotary elements are included.

The front sun gear FS is disposed to be able to be connected to and disconnected from the transmission input shaft 4 via the reverse clutch REV/C and to be able to be fixed to the transaxle case 3 via the 2-4 brake 2-4/B. The rear sun gear RS is disposed to be able to be connected to and disconnected from the transmission input shaft 4 via the low clutch L/C. The first rotary member M1 is disposed to be able to be fixed to the transaxle case 3 via the low 86 reverse brake L&R/B (one-way clutch OWC) and to be able to be connected to and disconnected from the transmission input shaft 4 via the high clutch H/C. The second rotary member M2 is directly coupled to the transmission output gear 5.

Figure 3:
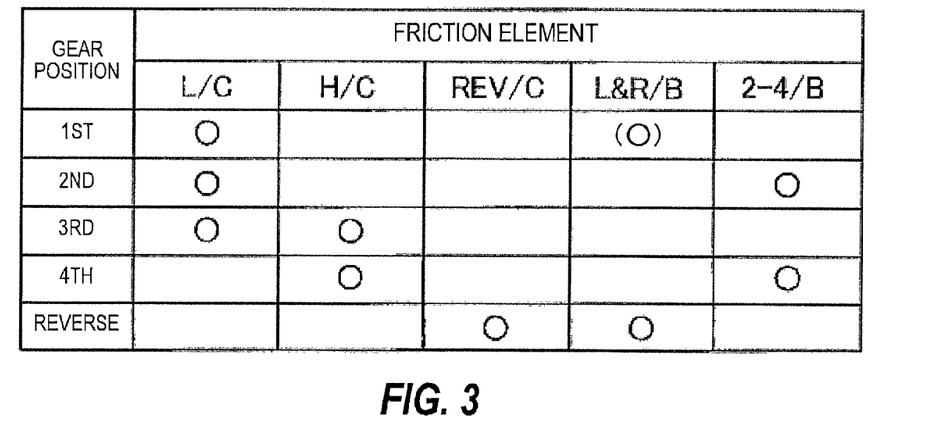
FIG. 3 is an engagement table of the automatic transmission.

FIG. 3 is an engagement table of the automatic transmission AT showing engaged states of the respective friction elements in each gear position. Each circle in FIG. 3 indicates that the corresponding friction element is in the engaged state and an empty cell indicates that the corresponding friction element is in a released state.

The automatic transmission AT realizes four forward gear positions and one reverse gear position by changing the engaged states of the respective friction elements provided in the transmission mechanism 6. A shift from a certain gear position to another gear position is made by releasing one friction element that is engaged in the certain gear position and engaging one friction element that is released in the certain gear position, i.e. by performing a replacing shift.

Specifically, a "first gear position" in which an engine brake is activated is realized by engaging the low clutch L/C and the low & reverse brake L&R/B. A "first gear position" in which the engine brake is not activated is realized by engaging only the low clutch L/C. A "second gear position" is realized by engaging the low clutch L/C and the 2-4 brake 2-4/B. A "third gear position" is realized by engaging the low clutch L/C and the high clutch H/C. A "fourth gear position" is realized by engaging the high clutch H/C and the 2-4 brake 2-4/B. A "reverse gear position" is realized by engaging the reverse clutch REV/C and the low & reverse brake L&R/B.

Figure 4:
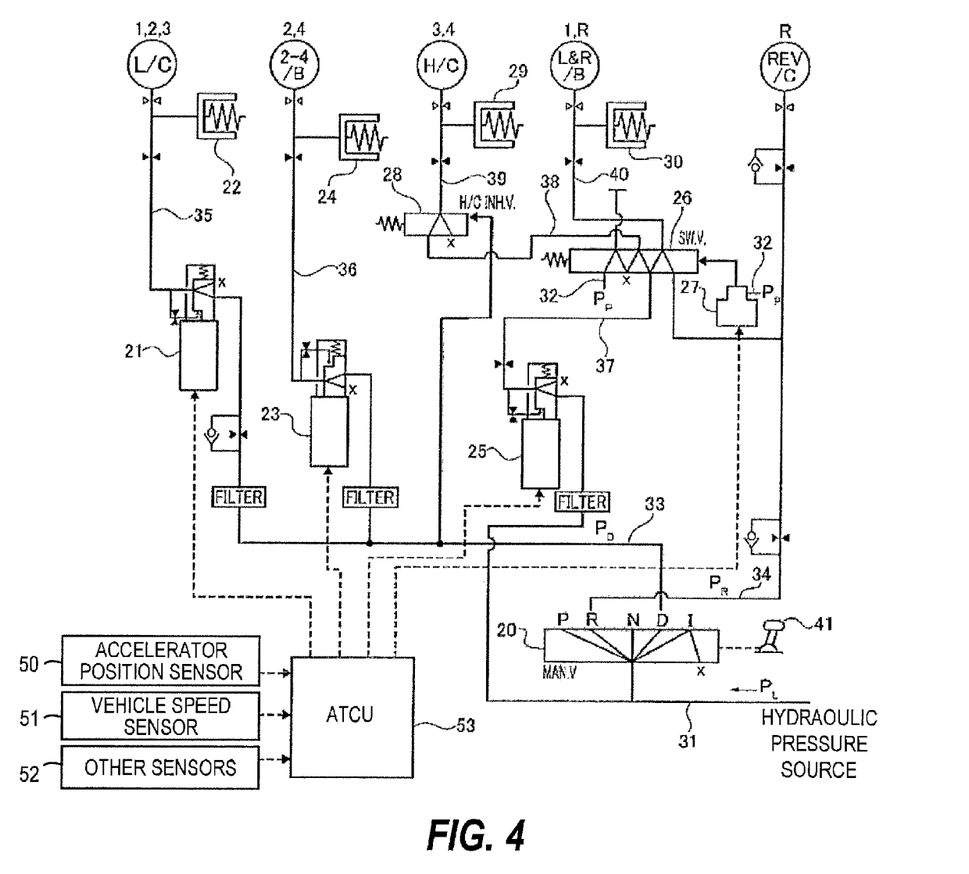
FIG. 4 is a diagram showing a control system of the automatic transmission.

FIG. 4 shows a control system of the automatic transmission AT. The control system of the automatic transmission AT is roughly comprised of a hydraulic control circuit and an electronic shift control system.

The hydraulic control circuit includes a manual valve 20, a low clutch pressure adjusting valve 21, a low clutch accumulator 22, a 2-4 brake pressure adjusting valve 23, a 2-4 brake accumulator 24, a dual purpose pressure adjusting valve 25, a switching valve 26, a solenoid 27, a high clutch inhibitor valve 28, a high clutch accumulator 29 and a low & reverse brake accumulator 30.

The hydraulic control circuit also includes a line pressure oil passage 31 (second oil passage), a pilot pressure oil passage 32, a D position pressure oil passage 33, an R position pressure oil passage 34 (third oil passage), a low clutch pressure oil passage 35, a 2-4 brake pressure oil passage 36, a dual purpose pressure output oil passage 37, a first high clutch pressure oil passage 38, a second high clutch pressure oil passage 39 and a low & reverse brake pressure oil passage 40 to cause the above components to communicate (first oil passage).

A selector 41 selects any one of a D position in which the gear positions from the first gear position (engine brake not activated) to the fourth gear speed are realized, an L position in which the first gear position (engine brake activated) and the second position are realized, an R position in which the reverse gear position is realized, an N position in which all the clutches are released and a P position.

The operation of the selector 41 is mechanically transmitted to the manual valve 20 via a shift cable, a link, a rod and the like, and the manual valve 20 is switched as a driver operates the selector 41.

For example, the manual valve 20 introduces a line pressure $P_L$ to the D position pressure oil passage 33 by causing the line pressure oil passage 31 and the D position pressure oil passage 33 to communicate when the D position is selected and introduces the line pressure $P_L$ as an R position pressure $P_R$ to the R position pressure oil passage 34 by causing the line pressure oil passage 31 and the R position pressure oil passage 34 to communicate when the R position is selected. Further, when the D position or the N position is selected, the manual valve 20 disconnects the line pressure oil passage 31 and the R position pressure oil passage 34 and causes the R position pressure oil passage 34 to be drained.

The low clutch pressure adjusting valve 21 is a normally high (characteristic of producing a hydraulic pressure when a power supply is off: same applies below) three-way high-capacity linear solenoid valve. The low clutch pressure adjusting valve 21 introduces a low clutch pressure adjusted based on the D position pressure $P_D$ from the D position pressure oil passage 33 as a source pressure to the low clutch L/C via the low clutch pressure oil passage 35 when the low clutch L/C is engaged (1, 2, 3). Further, the low clutch pressure adjusting valve 21 causes the low clutch pressure supplied to the low clutch L/C to be drained when the low clutch L/C is released (4, R).

The 2-4 brake pressure adjusting valve 23 is a normally low (characteristic of not producing a hydraulic pressure when a power supply is off: same applies below) three-way high-capacity linear solenoid valve. The 2-4 brake pressure adjusting valve 23 introduces a 2-4 brake pressure adjusted based on the D position pressure $P_D$ from the D position pressure oil passage 33 as a source pressure to the 2-4 brake 2-4/B via the 2-4 brake pressure oil passage 36 when the 2-4 brake 2-4/B is engaged (2, 4). Further, the 2-4 brake pressure adjusting valve 23 causes the 2-4 brake pressure supplied to the 2-4 brake 2-4/B to be drained when the 2-4 brake 2-4/B is released (1, 3, R).

The dual purpose pressure adjusting valve 25 is a normally high three-way high-capacity linear solenoid valve. The dual purpose pressure adjusting valve 25 introduces a hydraulic pressure adjusted based on the hydraulic pressure (line pressure $P_L$) supplied from a hydraulic pressure source (oil pump) without via the manual valve 20 as a source pressure to the high clutch H/C or the low & reverse brake L&R/B according to a switched state of the switching valve 26.

The solenoid 27 is a normally low ON/OFF solenoid. The switching valve 26 causes the dual purpose pressure output oil passage 37 and the first high clutch pressure oil passage 38 to communicate and causes the low & reverse brake pressure oil passage 40 and the R position pressure oil passage 34 to communicate when the solenoid 27 is off (no hydraulic pressure is generated). Conversely, the switching valve 26 causes the dual purpose pressure output oil passage 37 and the low & reverse brake pressure oil passage 40 to communicate and disconnects the low & reverse brake pressure oil passage 40 and the R position pressure oil passage 34 when the solenoid 27 is on (hydraulic pressure is generated).

The switching valve 26 is switched by an ON/OFF control of the solenoid 27 by an AT control unit (hereinafter, "ATCU") 53 according to a transmission state of the automatic transmission AT and a vehicle speed VSP.

Specifically, the ATCU 53 turns the solenoid 27 off to drain the hydraulic pressure of the low & reverse brake L&R/B when no shift associated with a position change is being made (D, N position steady state) at the time of selection of the D or N position or a shift associated with a position change between D and N is being made (D-N, N-D position transient state) and the vehicle speed VSP is higher than an ON/OFF switching vehicle speed. In this way, the low & reverse brake L&R/B is prevented from being mistakenly engaged in the D or N position steady state or the D-N or N-D position transient state (failsafe).

On the contrary, the ATCU 53 turns the solenoid 27 on to disconnect the low & reverse brake pressure oil passage 40 and the R position pressure oil passage 34 even in the D or N position steady state or the D-N or N-D position transient state if the vehicle speed VSP is equal to or lower than the ON/OFF switching vehicle speed. In this way, the low & reverse brake L&R/B is prevented from being suddenly engaged by not supplying the R position pressure $P_R$ to the low & reverse brake L&R/B via the R position pressure oil passage 34, the switching valve 26 and the low & reverse brake pressure oil passage 40 even if the selector 41 is operated to the R position in a short time and the switching valve 26 is switched later than the manual valve 20 (engagement shock prevention).

The switching of the switching valve 26 is delayed for the same reason as the sequence valve in JP2002-147587A, i.e. due to a delay in the operation of the solenoid 27 to prevent chattering and a delay between the supply of the hydraulic pressure generated by the solenoid 27 and actual switching of the switching valve 26.

The ON/OFF switching vehicle speed is an upper limit value of the vehicle speed at which a change to the R position is permitted during forward driving and, for example, set at a value between 10 km/h to 20 km/h. The ON/OFF switching vehicle speed is, for example, set at a vehicle speed obtained by adding a margin to an upper limit value of the vehicle speed at which durability of the clutches, brakes and the like can be ensured even if a change to the R position is made, a vehicle speed obtained by adding a margin to a maximum vehicle speed accomplishable by creep driving, an upper limit value of the vehicle speed at which a shock which occurs when the gear position is changed to the R position is suppressed to or below a permissible level, or an upper limit value of the vehicle speed expected to enable a driver to make a change to the R position.

Since an interlock occurs if the low & reverse brake L&R/B is mistakenly engaged in the third or higher gear position, the ON/OFF switching vehicle speed is set at a vehicle speed equal to or lower than a 3-2 vehicle speed (e.g. 25 km/h), at which a shift is made from the third gear position to the second gear position, so that the hydraulic pressure of the low & reverse brake L&R/B is drained to reliably release the low & reverse brake L&R/B in the third or higher gear position.

If the selector 41 is operated from the D or N position to the R position, the ATCU 53 turns the solenoid 27 on during a shift associated with the position change, thereby causing the dual purpose pressure output oil passage 37 and the low & reverse brake pressure oil passage 40 to communicate. The dual purpose pressure adjusting valve 25 gradually increases the hydraulic pressure to the low & reverse brake L&R/B, whereby the low & reverse brake L&R/B is gradually engaged to alleviate a shock at the time of engagement.

After the shift is completed, the ATCU 53 turns the solenoid 27 off to cause the low & reverse brake pressure oil passage 40 and the R position pressure oil passage 34 to communicate, whereby the R position pressure $P_R$ (full hydraulic pressure) is supplied to the low & reverse brake L&R/B.

The high clutch inhibitor valve 28 is arranged between the switching valve 26 and the high clutch H/C. The high clutch inhibitor valve 28 is switched according to the D position pressure $P_D$ generated when the D position is selected, causes the second high clutch pressure oil passage 39 and the first high clutch pressure oil passage 38 to communicate when the D position pressure $P_D$ acts and causes the second high clutch pressure oil passage 39 to be drained when the D position pressure $P_D$ does not act.

On the other hand, the electronic shift control system includes an accelerator position sensor 50, a vehicle speed sensor 51, other sensors 52 (transmission input rotation speed sensor, inhibitor switch, etc.) and the ATCU 53.

Information from the accelerator position sensor 50, the vehicle speed sensor 51 and the other sensors 52 is input to the ATCU 53. The ATCU 53 searches a target gear position, which is an optimal gear position, based on the position of a driving point determined by an accelerator position APO and the vehicle speed VSP on a shift map during driving with the D position selected. Then, the ATCU 53 outputs control commands to the low clutch pressure adjusting valve 21, the 2-4 brake pressure adjusting valve 23, the dual purpose pressure adjusting valve 25 and the solenoid 27 to realize the target gear position. The shift map is a map written with an up-shift line and a down-shift line in relation to the accelerator position APO and the vehicle speed VSP.

Figure 5:
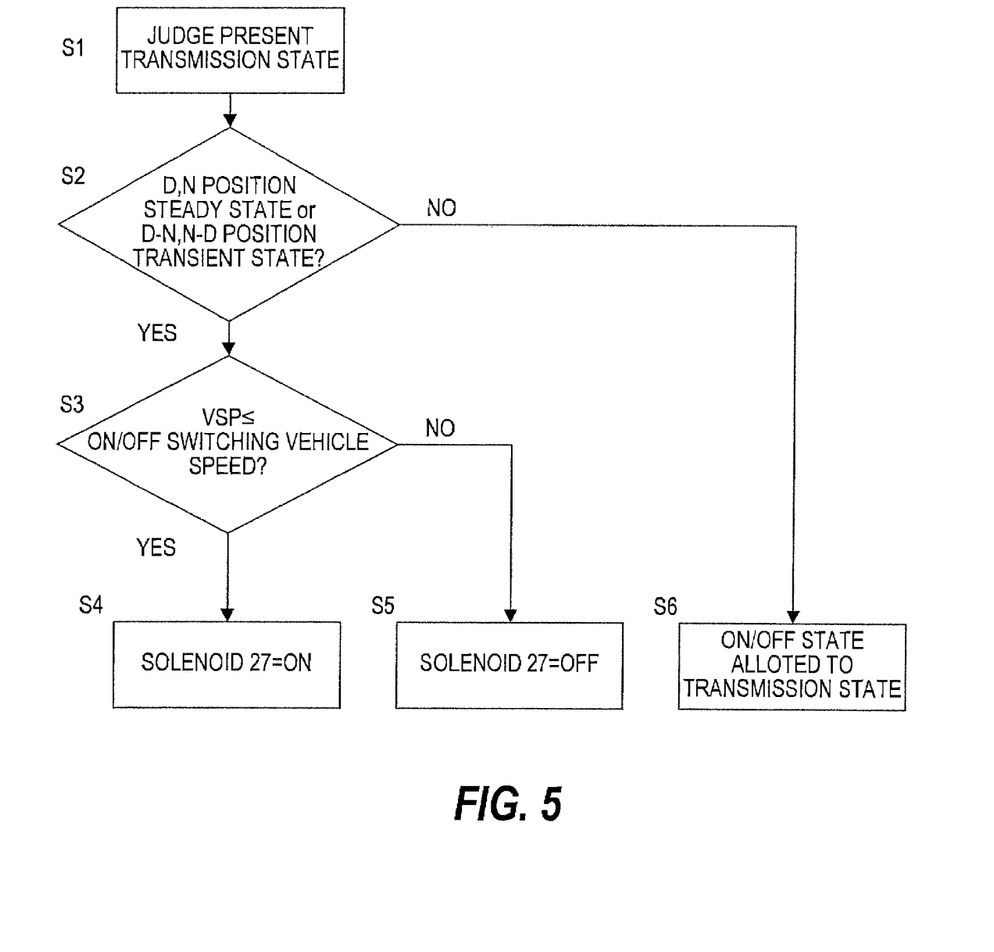
FIG. 5 is a flow chart showing a content of an ON/OFF switching control of a solenoid by an AT control unit.

FIG. 5 is a flow chart showing a content of the ON/OFF switching control of the solenoid 27 by the ATCU 53, and this control is repeatedly performed in the ATCU 53. With reference to FIG. 5, the ON/OFF switching control of the solenoid 27 is described.

In Step S1, the ATCU 53 judges the present transmission state of the automatic transmission AT. The present transmission state can be judged based on the position of the selector 41 detected by the inhibitor switch, a comparison between a speed ratio corresponding to the target gear position and an actual speed ratio, and the like.

In Step S2, the ATCU 53 judges whether or not the transmission state falls under any one of the D position steady state, the D-N position transient state, the N-D position transient state and the N position steady state. The process proceeds to Step S3 if the transmission state falls under any one of these states while proceeding to Step S6 if it falls under none of these states.

In Step S3, the ATCU 53 judges whether or not the vehicle speed VSP is equal to or lower than the ON/OFF switching vehicle speed. The process proceeds to Step S4 if the vehicle speed is equal to or lower than the ON/OFF switching vehicle speed while proceeding to Step S5 if it is in excess of the ON/OFF switching vehicle speed.

In Step S4, the ATCU 53 turns the solenoid 27 on. When the solenoid 27 is turned on, the switching valve 26 causes the dual purpose pressure output oil passage 37 and the low & reverse brake pressure oil passage 40 to communicate and disconnects the low & reverse brake pressure oil passage 40 and the R position pressure oil passage 34. Thus, the low 86 reverse brake L&R/B is prevented from being suddenly engaged even if the selector 41 is operated to the R position in a short time.

In Step S5, the ATCU 53 turns the solenoid 27 off. When the solenoid 27 is turned off, the switching valve 26 causes the dual purpose pressure output oil passage 37 and the first high clutch pressure oil passage 38 to communicate and causes the low 86 reverse brake pressure oil passage 40 and the R position pressure oil passage 34 to communicate. Thus, the hydraulic pressure of the low 86 reverse brake L&R/B is drained to prevent the low 86 reverse brake L&R/B from being mistakenly engaged when the vehicle is driving at a speed higher than the ON/OFF switching vehicle speed.

In Step S6, the ATCU 53 sets the solenoid 27 in an ON or OFF state allotted to the transmission state. For example, if the transmission state is the R position steady state, the ATCU 53 sets the solenoid 27 in the OFF state allotted to the R position steady state.

Figure 6:
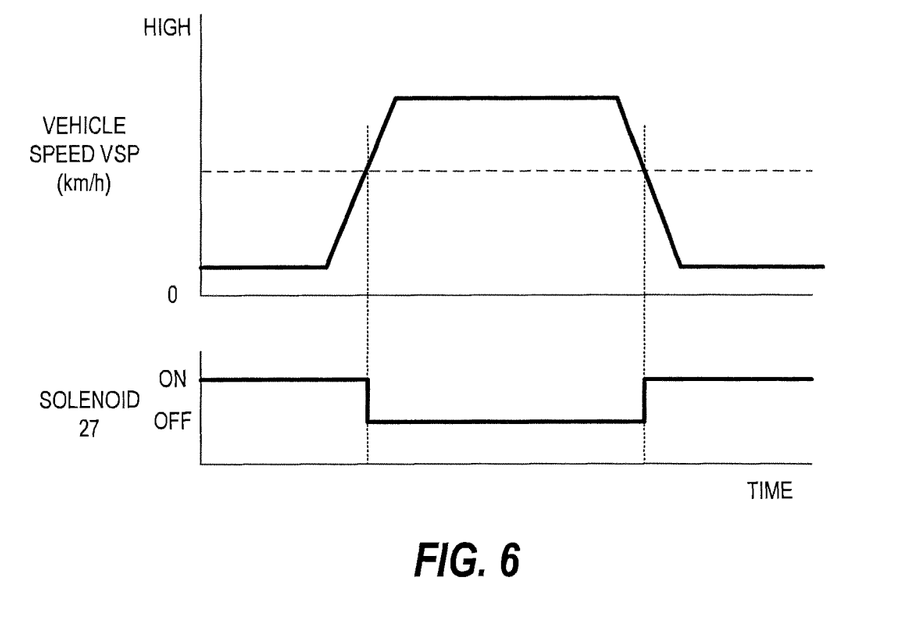
FIG. 6 is a time chart showing an ON/OFF switching state of the solenoid.

FIG. 6 is a time chart showing a state where the solenoid 27 is ON/OFF switched while the vehicle is driving in the D position steady state.

The solenoid 27 is ON/OFF switched according to the above ON/OFF switching control. The solenoid 27 is turned on if the vehicle speed VSP is equal to or lower than the ON/OFF switching vehicle speed. On the contrary, the solenoid 27 is turned off if the vehicle speed VSP is in excess of the ON/OFF switching vehicle speed.

Although not shown, the solenoid 27 is similarly ON/OFF switched according to the vehicle speed VSP also in the N position steady state, the D-N and N-D position transient states.

Next, functions and effects of this embodiment are described.

When the selector 41 is operated from the D position (or N position) to the R position, the low & reverse brake L&R/B is engaged in accordance with the engagement table (FIG. 3).

Figure 7A:
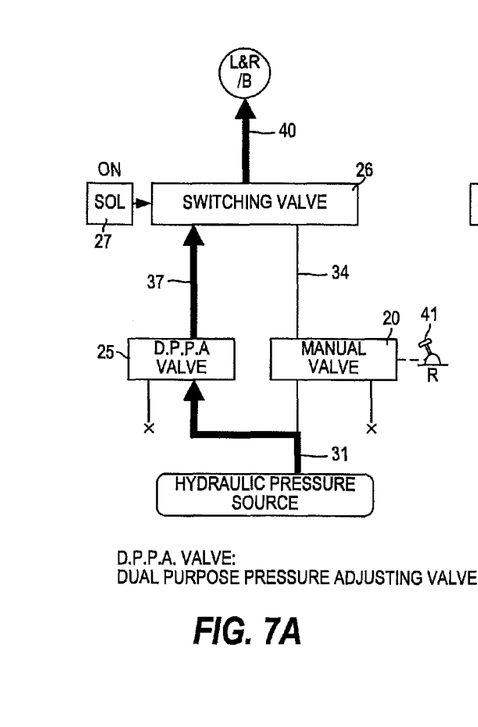
FIGS. 7A to 7C are diagrams showing a supplied state of a hydraulic pressure to a low & reverse brake.
Figure 7B:
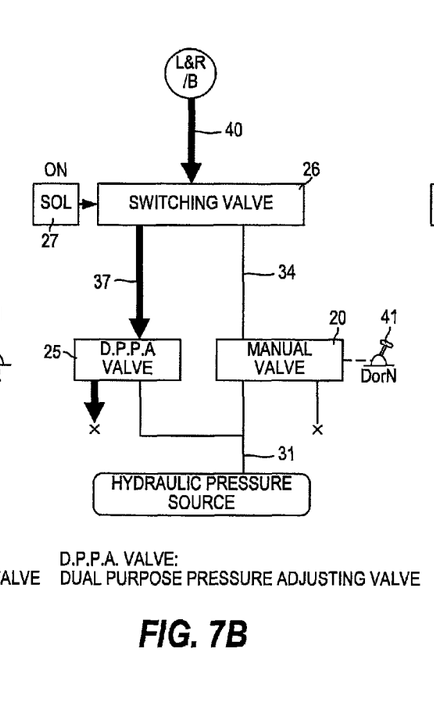

During a shift associated with a position change, the hydraulic pressure adjusted by the dual purpose pressure adjusting valve 25 is supplied to the low & reverse brake L&R/B and regulated to gradually increase. Thus, the low & reverse brake L&R/B is gradually engaged, i.e. the low & reverse brake L&R/B is engaged later than the reverse clutch REV/C that is engaged together with the low & reverse brake L&R/B, whereby an engagement shock of the low & reverse brake L&R/B is alleviated (FIG. 7A).

Here, if the switching valve 26 is in a state to cause the low & reverse brake pressure oil passage 40 and the R position pressure passage 34 to communicate during driving in the D position (or N position), there is a possibility that the low & reverse brake L&R/B is suddenly engaged to cause a shock if the selector 41 is operated to the R position in a short time.

This is because, if the selector 41 is operated in a short time and the switching valve 26 is switched later than the manual valve 20, the low & reverse brake pressure oil passage 40 and the R position pressure passage 34 temporarily communicate at an initial stage of the shift associated with the position change, whereby the R position pressure is supplied to the low & reverse brake L&R/B via the R position pressure passage, the switching valve 26 and the low & reverse brake pressure oil passage 40.

However, in this embodiment, the solenoid 27 is turned on (Step S4) if the vehicle speed VSP is equal to or lower than the ON/OFF switching vehicle speed during driving in the D position (or N position), the low & reverse brake pressure oil passage 40 (first oil passage) and the R position pressure passage 34 (third oil passage) are disconnected. Thus, even if the selector 41 is operated to the R position in a short time, the R position pressure $P_R$ is not supplied to the low & reverse brake L&R/B, wherefore there is no likelihood that the low & reverse brake L&R/B is suddenly engaged and a resulting shock occurs.

Figure 7C:
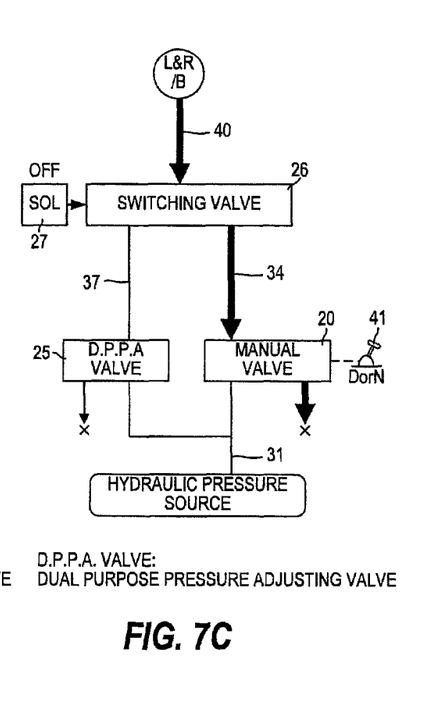

Further, in this embodiment, the solenoid 27 is turned off (Step S5) if the vehicle speed VSP exceeds the ON/OFF switching vehicle speed, and the low & reverse brake pressure oil passage 40 and the R position pressure passage 34 communicate as shown in FIG. 7C. Thus, the hydraulic pressure of the low & reverse brake L&R/B is drained via the low & reverse brake pressure oil passage 40, the switching valve 26, the R position pressure passage 34 and the manual valve 20, wherefore the low & reverse brake L&R/B is not engaged and an interlock and shock caused by the engagement of this friction element during forward driving can be prevented even if the hydraulic pressure is output from the dual purpose pressure adjusting valve 25.

Although the embodiment of the present invention has been described above, the above embodiment is merely an illustration of an example of application of the present invention and is not of the nature to limit the technical range of the present invention to the specific construction of the above embodiment.

For example, in the above embodiment, the solenoid 27 is ON/OFF switched using the ON/OFF switching vehicle speed as a threshold value in the D and N position steady states and the D-N and N-D position transient states. However, a frequency of repeating ON/OFF switching of the solenoid 27 may be reduced during driving at a vehicle speed near the ON/OFF switching vehicle speed by providing the threshold value with a hysteresis, i.e. by making the vehicle speed at which the solenoid 27 is turned on and the vehicle speed at which the solenoid 27 is turned off different.

This application claims priority based on Japanese Patent Application No. 2010-93979, filed with the Japan Patent Office on Apr. 15, 2010, the entire content of which is incorporated into this specification by reference.

What is claimed is:

1. An automatic transmission which includes a planetary gear and a plurality of friction elements and realizes a plurality of gear positions by changing engaged states of the plurality of friction elements, the plurality of friction elements including a reverse friction element which is engaged when a selector is in an R position and released when the selector is in a D position in which an engine brake is not activated, the automatic transmission comprising:

a hydraulic pressure source;

a switching valve and a manual valve arranged between the hydraulic pressure source and the reverse friction element and adapted to switch oil passages in conjunction with a selector operation, the switching valve being switched later than the manual valve;

a first oil passage connecting the reverse friction element and the switching valve;

a second oil passage connecting the hydraulic pressure source and the manual valve;

a third oil passage connecting the switching valve and the manual valve; and a control unit which controls the switching of the switching valve;

wherein:

the manual valve disconnects the second and third oil passages when the selector is in the D position or the N position and causes the second and third oil passages to communicate when the selector is in the R position; and the control unit switches the switching valve to disconnect the first and third oil passages when the selector is in the D position or the N position and a vehicle equipped with the automatic transmission is driving at a vehicle speed equal to or lower than a predetermined vehicle speed.

2. The automatic transmission according to claim 1, wherein the predetermined vehicle speed is an upper limit value of a vehicle speed at which a change to the R position is permitted during forward driving.

3. A hydraulic control method in an automatic transmission including a planetary gear, a plurality of friction elements including a reverse friction element which is engaged when a selector is in an R position and released when the selector is in a D position in which an engine brake is not activated, a hydraulic pressure source, a switching valve and a manual valve arranged between the hydraulic pressure source and the reverse friction element and adapted to switch oil passages in conjunction with a selector operation, the switching valve being switched later than the manual valve, a first oil passage connecting the reverse friction element and the switching valve, a second oil passage connecting the hydraulic pressure source and the manual valve, and a third oil passage connecting the switching valve and the manual valve, the manual valve disconnecting the second and third oil passages when the selector is in the D position or the N position and causing the second and third oil passages to communicate when the selector is in the R position, a plurality of gear positions being realized by changing engaged states of the plurality of friction elements, wherein switching the switching valve to disconnect the first and third oil passages when the selector is in the D position or the N position and a vehicle equipped with the automatic transmission is driving at a vehicle speed equal to or lower than a predetermined vehicle speed.

4. The hydraulic control method according to claim 3, wherein the predetermined vehicle speed is an upper limit value of a vehicle speed at which a change to the R position is permitted during forward driving.

5. An automatic transmission which includes a planetary gear and a plurality of friction elements and realizes a plurality of gear positions by changing engaged states of the plurality of friction elements, the plurality of friction elements including a reverse friction element which is engaged when a selector is in an R position and released when the selector is in a D position in which an engine brake is not activated, the automatic transmission comprising:

a hydraulic pressure source;

a switching valve and a manual valve arranged between the hydraulic pressure source and the reverse friction element and adapted to switch oil passages in conjunction with a selector operation, the switching valve being switched later than the manual valve;

a first oil passage connecting the reverse friction element and the switching valve;

a second oil passage connecting the hydraulic pressure source and the manual valve;

a third oil passage connecting the switching valve and the manual valve; and control means for controlling the switching of the switching valve;

wherein:

the manual valve disconnects the second and third oil passages when the selector is in the D position or the N position and causes the second and third oil passages to communicate when the selector is in the R position; and the control means switches the switching valve to disconnect the first and third oil passages when the selector is in the D position or the N position and a vehicle equipped with the automatic transmission is driving at a vehicle speed equal to or lower than a predetermined vehicle speed.

6. The automatic transmission according to claim 5, wherein the predetermined vehicle speed is an upper limit value of a vehicle speed at which a change to the R position is permitted during forward driving.

* * * * *